Figures 1, 2:
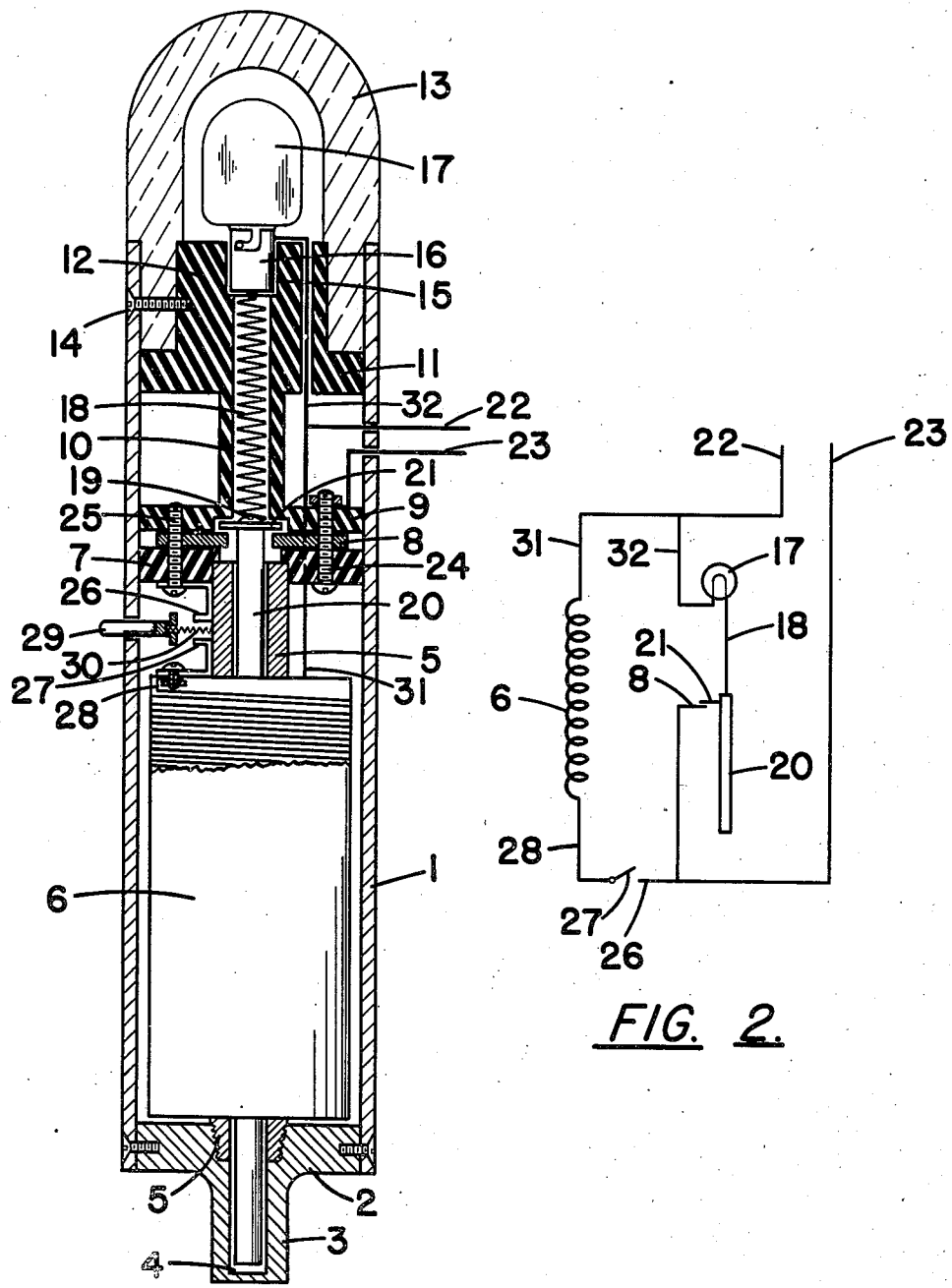

William A. Bruce INVENTOR.
BY P. J. Whelan

Patented May 11, 1943

2,318,666

UNITED STATES PATENT OFFICE 2,318,666

MAGNETIC PERMEABILITY INDICATOR

William A. Bruce, Tulsa, Okla., assignor to Standard Oil Development Company, a corporation of Delaware Application November 12, 1940, Serial No. 365,175

1 Claim. (Cl. 175—183)

The present invention is directed to an indicating device for use in testing the magnetic permeability of metals, and particularly adapted for determining when it is safe to quench a welded joint.

It has already been ascertained that a weld in cooling passes through a critical point in its molecular structure above which it is unsafe to quench the weld. It has been ascertained also that the magnetic permeability of the weld changes with the molecular changes of the metal, and registers a sharp increase at the aforesaid critical point. The practice, therefore, has been developed of observing the magnetic permeability of welded joints during their cooling so as to determine when the critical point is reached.

The principal object of the present invention is the provision of a device adapted to be carried in the pocket for testing metals for magnetic permeability, and particularly welded joints.

A particular object of the present invention is the provision of a device of the character described having an electrical signalling means and an electrical circuit for operating said means including a magnetic switch in the magnetic circuit of which the metal to be tested is adapted to be included whereby when the permeability of said metal reaches a predetermined value the switch will close and actuate the signalling means.

Further objects and advantages of the present invention will appear from the accompanying drawing in which—

Fig. 1 is a longitudinal section of a device according to the present invention; and Fig. 2 is a diagrammatic illustration of the electrical circuit in said device.

Referring to the drawing in detail, numeral 1 designates a tubular metal case, preferably of about the size of a fountain pen, having mounted at the lower end thereof a cap 2 which is provided with an outwardly extending knob 3, having an internal recess or well 4. The element 2, or at least the lower end thereof, that is the bottom surface of the well, is preferably made of soft iron of high magnetic permeability. Screwed into the innerface of the head 2 is an elongated tube of soft iron 5 which constitutes the core of a solenoid 6. The upper end of the tube 5 is held in place by a washer 7 of insulating material. Above washer 7 is a metal disk 8 held in place on washer 7 by a flange 9 of insulating material which forms the lower end of a tubular member 10 having an inner bore coextensive with the bore in tube 5 and having at its upper end another flange 11 and an annular portion 12 forming with the outer end of the casing 1 a seat for a glass head 13 held in place by a set screw 14. The inner portion of the annular end 12 forms a seat 15 for a light socket 16 in which is arranged a light bulb 17.

Welded to the lower end of the light socket is a spring 18 arranged in the bore of member 10 and being coextensive therewith. The other end of the spring is connected to the head 19 of a rod 20 slidably mounted in the tube 5, and made of soft iron. At its upper end the rod 20 has a flange 21 adapted to seat on the disk 8, but normally held off this seat by the spring 18.

Numerals 22 and 23 indicate electric leads which are connected to a battery. Conductor 23 is connected to a stud 24 passing through disk 7 and flange 9 as well as through the disk 8. Also passing through the disk is a stud 25, to the lower end of which is connected one element 26 of a contact. The other element 27 of this switch is connected to one terminal 28 of the solenoid. The two elements, 26 and 17, form a seat for a metal button 29, which is normally held off this seat by a spring 30. The other lead 22 is connected to the other terminal 31 of the solenoid and is also connected to a conductor 32 to the light socket.

With the parts in the position shown the button 29 is depressed and closes the solenoid circuit, thereby magnetizing the iron rod 20. The lower end of this rod is spaced from the bottom of the well 4 a short distance corresponding to the distance between the flange 21 and the disk 8. When the knob 3 is placed against the metal the magnetic permeability of which is to be tested, and the magnetic permeability of this metal reaches a predetermined value, the rod will be attracted to the metal, and will move to the bottom of the well, thereby bringing flange 21 onto the disk 8 and closing the light circuit, spring 18 forming one of the conductors in this circuit. Thus, when the magnetic permeability of the metal being tested reaches the predetermined value the light will flash. What the magnetic permeability of the metal must be in order to work the signal is determined by the strength of the spring 18.

In practice the spring is so selected that it will permit closure of the switch when a weld reaches the critical point in its cooling stage. Thus, as soon as the weld is completed the knob 3 is placed against it and when the light flashes the operator knows that it is safe to quench the weld.

It will be apparent that changes may be made in the specific embodiment described above, which is presented only for purposes of illustration, without departing from the scope of the present invention. Such changes as are within the skill of the artisan are contemplated within the scope of the appended claim in which it is intended to claim the present invention as broadly as the prior art permits.

I claim:

A hand device for testing welds comprising a pair of concentric tubular members, a head on said members having a metal surface adapted to be placed against the weld to be tested, a well in said head member in alignment with said inner tubular member, a soft iron core slidably mounted in said inner tubular member and extending into said well, a spring normally holding the end of said core spaced from the end of said well, a coil for magnetizing said core arranged around said inner tubular member, a signaling means arranged in said casing, an electrical circuit for operating said means and a switch in said circuit adapted to be operated by movement of said magnetic element into said well.

WILLIAM A. BRUCE.